US012688583B2

(12) United States Patent
Tearney et al.

(10) Patent No.: US 12,688,583 B2
(45) Date of Patent: Jul. 21, 2026

(54) SYSTEM AND METHOD FOR DIAGNOSING CELIAC DISEASE

(71) Applicant: The General Hospital Corporation, Boston, MA (US)

(72) Inventors: Guillermo J. Tearney, Cambridge, MA (US); Girish Gududappanavar Nagarajappa, Thyavanige (IN); David Odeke Otuya, Revere, MA (US)

(73) Assignee: The General Hospital Corporation, Boston, MA (US)

( * ) Notice: Subject to any disclaimer, the term of this patent is extended or adjusted under 35 U.S.C. 154(b) by 265 days.

(21) Appl. No.: 18/548,951

(22) PCT Filed: Mar. 7, 2022

(86) PCT No.: PCT/US2022/019108
§ 371 (c)(1),
(2) Date: Sep. 5, 2023

(87) PCT Pub. No.: WO2022/187731
PCT Pub. Date: Sep. 9, 2022

(65) Prior Publication Data
US 2024/0153084 A1 May 9, 2024

Related U.S. Application Data

(60) Provisional application No. 63/157,535, filed on Mar. 5, 2021.

(51) Int. Cl.
*G06K 9/00* (2022.01)
*G06T 7/00* (2017.01)

(52) U.S. Cl.
CPC .. *G06T 7/0012* (2013.01); *G06T 2207/10056* (2013.01); *G06T 2207/30028* (2013.01)

(58) Field of Classification Search
CPC ......... G06T 7/0012; G06T 2207/10056; G06T 2207/30028; G06T 2207/10068; A61B 5/0066; A61B 5/0073; A61B 5/4255
See application file for complete search history.

(56) References Cited

U.S. PATENT DOCUMENTS 7,684,599 B2 * 3/2010 Horn ..................... A61B 5/065
382/199
8,768,024 B1 7/2014 Zingman et al.
(Continued)

FOREIGN PATENT DOCUMENTS

RU 2740430 C1 1/2021
WO 20221877731 9/2022

OTHER PUBLICATIONS

Ciaccio, E et al., "Methods to quantitate videocapsule endoscopy images in celiac disease", 1895-1911, Bio-Medical Materials and Engineering. Online 2014, doi: 10.3233/BME-140999.
(Continued)

*Primary Examiner* — Shervin K Nakhjavan
(74) *Attorney, Agent, or Firm* — QUARLES & BRADY LLP

(57) ABSTRACT

A method for identifying an intestinal disorder in a subject, including: obtaining an image of a small intestinal region of the subject; identifying a villus structure in the image; measuring at least one feature based on the identified villus structure to obtain a metric; and identifying an intestinal disorder based on the metric.

18 Claims, 13 Drawing Sheets

1200

(56) References Cited

U.S. PATENT DOCUMENTS

| | | | | |
|---|---|---|---|---|
| 9,076,078 | B2 * | 7/2015 | Miyashita | G06F 18/2148 |
| 9,324,145 | B1 * | 4/2016 | Cherevatsky | A61B 1/000094 |
| 9,881,381 | B2 * | 1/2018 | Kono | G06T 7/11 |
| 10,121,245 | B2 * | 11/2018 | Chen | G06V 20/698 |
| 10,182,791 | B2 * | 1/2019 | Zhou | A61B 10/0233 |
| 10,736,499 | B2 * | 8/2020 | Yamanashi | A61B 1/0646 |
| 11,147,503 | B2 | 10/2021 | Tearney et al. | |
| 2007/0255095 | A1 * | 11/2007 | Gilreath | A61B 5/4255 |
| | | | | 600/102 |
| 2013/0310643 | A1 | 11/2013 | Gora et al. | |
| 2014/0051594 | A1 | 2/2014 | Lois | |
| 2014/0187999 | A1 * | 7/2014 | Tearney | A61B 10/04 |
| | | | | 600/562 |
| 2017/0358084 | A1 * | 12/2017 | Yamada | G06T 7/0016 |
| 2018/0160965 | A1 | 6/2018 | Tearney et al. | |
| 2020/0139092 | A1 | 5/2020 | Tearney et al. | |
| 2021/0358121 | A1 | 11/2021 | Bangia et al. | |
| 2022/0292671 | A1 * | 9/2022 | Misawa | G16H 50/20 |
| 2023/0401700 | A1 * | 12/2023 | Dekel | G16H 50/20 |

OTHER PUBLICATIONS

Dong et al., (May 2018), "Unsedated Transnasal OCT Endomicroscopy of the Small Intestine", Gastroenterology.

Dong et al., "Optimizing the villi visualization by tethered capsule OCT endomicroscopy for comprehensive imaging of human duodenum", (Conference Presentation) Proc. SPIE 10040, Endoscopic Microscopy XII, 100400D (Apr. 19, 2017); https://doi.org/10.1117/12.2255772.

Girish et al., "Non-invasive tethered capsule endomicroscopy imaging biomarkers for the diagnosis of the celiac disease from unsedated patients," 2021 SPIE Presentation.

Gora, Michalina J. et al., "Tethered Capsule Endomicroscopy for unsedated microscopic imaging of the esophagus, stomach, and duodenum in humans", Gastrointestinal Endoscopy, vol. 88, Issue 5, 830-840, Jul. 19, 2018.

International Search Report and Written Opinion for corresponding Application No. PCT/US2022/019108, mailed May 17, 2022.

Masci et al., "Optical coherence tomography in pediatric patients: a feasible technique for diagnosing celiac disease in children with villous atrophy" Digestive and Liver Disease, vol. 41, Issue 9, Sep. 2009, 639-643.

Wimmer et al., "CNN transfer learning for the automated diagnosis of celiac disease," 2016 Sixth International Conference on Image Processing Theory, Tools and Applications (IPTA), Oulu, Finland, 2016, pp. 1-6, doi: 10.1109/IPTA.2016.7821020.

Ciaccio et al., "Recommendations to quantify villous atrophy in video capsule endoscopy images of celiac disease patients, World Journal of Gastrointestinal Endoscopy", U.S., Baishideng Publishing Group Inc, Oct. 16, 2016, vol. 8, Issue 18, pp. 653-662.

* cited by examiner

SYSTEM AND METHOD FOR DIAGNOSING CELIAC DISEASE

CROSS-REFERENCE TO RELATED APPLICATIONS

The present application represents the U.S. national stage entry of International Patent Application Ser. No. PCT/US2022/019108, filed on Mar. 7, 2022, which is based on and claims priority from U.S. Patent Application Ser. No. 63/157,535, filed on Mar. 5, 2021, the entire disclosures of each of which are incorporated herein by reference.

STATEMENT REGARDING FEDERALLY SPONSORED RESEARCH

This invention was made with government support under grant number R01DK100569 awarded by the National Institutes of Health. The government has certain rights in the invention.

BACKGROUND

Celiac disease (CD) is a common autoimmune disease with a prevalence of approximately 1% of the population. Celiac disease occurs as a result of a genetic predisposition and gluten ingestion. Celiac disease causes damage to the villi that are responsible for nutrient absorption. Celiac disease has numerous effects and can cause anemia, dyspepsia, unexpected weight loss, nausea and vomiting, protein and vitamin malabsorption, weakness, stomach and abdominal pain, chronic diarrhea, failure to thrive, dermatitis herpetiformis, liver disease, and/or infertility. Given the prevalence of CD and the many effects on those with the condition, there is a need for improvements in the diagnosis of CD.

SUMMARY

Accordingly, new systems, methods, and media for diagnosing CD are desirable.

In one embodiment, a method for identifying an intestinal disorder in a subject, including: obtaining an image of a small intestinal region of the subject; identifying a villus structure in the image; measuring at least one feature based on the identified villus structure to obtain a metric; and identifying an intestinal disorder based on the metric.

In another embodiment, a system for identifying an intestinal disorder in a subject, including: a processor coupled to a memory, the processor being configured to: obtain an image of a small intestinal region of the subject using tethered capsule endomicroscopy (TCE); identify a villus structure in the image; measure at least one feature based on the identified villus structure to obtain a metric; and identify an intestinal disorder based on the metric.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 3A shows segmented OCT image data from a subject with active CD, FIG. 3B shows segmented OCT image data from a subject with in active CD, and FIG. 3C shows segmented OCT image data from a subject without CD.

FIG. 10 shows an example of a system for identifying an intestinal disorder in a subject in accordance with some embodiments of the disclosed subject matter.

DETAILED DESCRIPTION

In accordance with some embodiments of the disclosed subject matter, mechanisms (which can include systems, methods, and media) for diagnosing CD are provided.

The diagnosis for celiac disease usually involves identifying a combination of evidence of villous abnormalities in duodenal biopsies along with the presence of biomarkers shown through specific serological tests. Currently, the most reliable method (the "gold standard") for diagnosing CD requires obtaining biopsies from the small intestine via upper esphagogastroduodenoscopy (EGO). However, the EGD procedure is limited by factors such as its invasiveness, the need for sedation of the patient, the cost of the procedure, the time involved for conducting the procedure and analyzing the results, inconvenience to caregivers, and possible sampling error.

Identifying biomarkers also has a number of limitations. For example, most serological tests, while simple and easy, require access to centralized facilities for processes such as ELISA and immunochromatography. While many of available biomarkers for the screening and diagnosis of celiac disease could be reliable, there is still a need for blood biomarkers which can show the presence of villous abnormalities without the need for also performing a duodenal mucosal biopsy.

Accordingly, the present disclosure provides embodiments of systems, methods, and biomarkers for use in non-invasive tethered capsule endomicroscopy imaging for the diagnosis of the celiac disease from unsedated patients. The concept involves using features extracted from OCT frames to distinguish normal subjects from celiac patients. Tethered capsule endomicroscopy capsule can be used for screening celiac disease patients before they are subjected to EGD and intestinal biopsy, saving on time and resources.

Figure 1A:
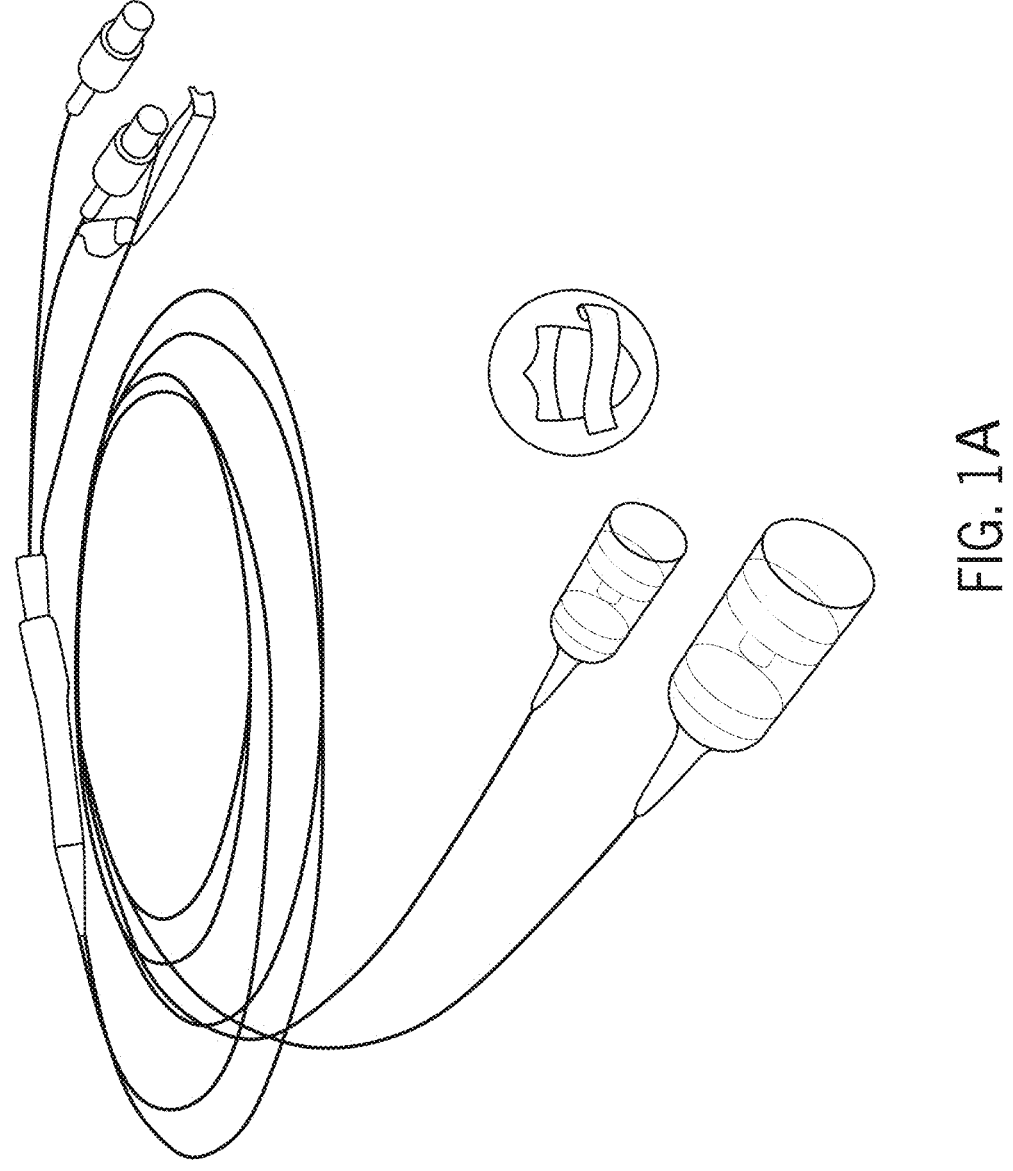
FIG. 1A shows a photograph of a tethered capsule endomicroscopy (TCE) device that can be used to carry out the disclosed procedures.
Figure 1B:
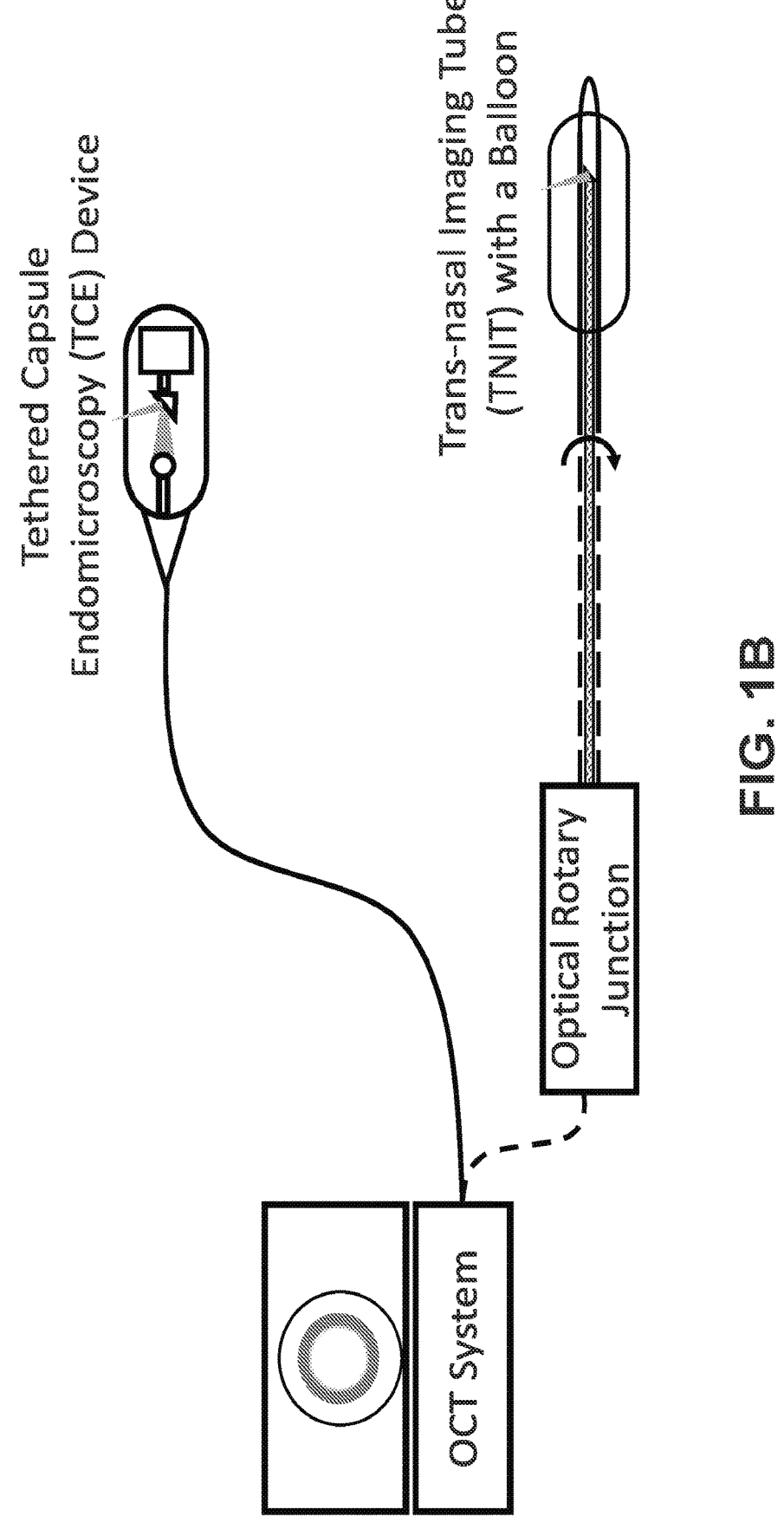
FIG. 1B shows a diagram of optical coherence tomography (OCT)-based devices that can be used to carry out the disclosed procedures; the top portion shows a TCE device while the bottom portion shows an optional configuration in which the device can be provided as part of a trans-nasal imaging tube (TNIT) device with a balloon which can be coupled to the OCT system via an optical rotary junction.
Figure 1C:
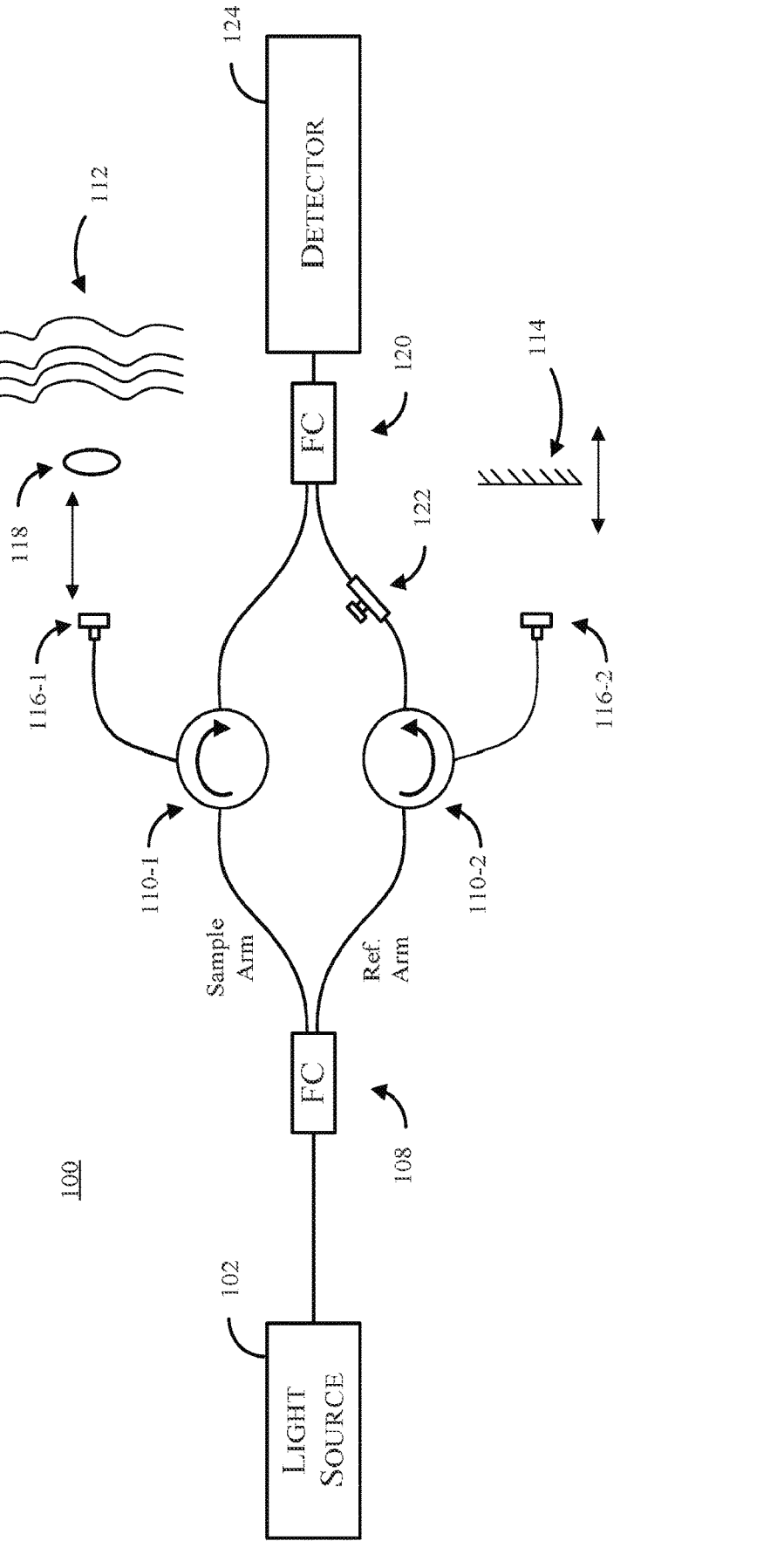
FIGS. 10 and 1D show examples of an optical coherence tomography system for use with the present system.

Embodiments of the present disclosure provide improvements over current procedures by obtaining image data for analysis using a minimally invasive (i.e. a light-based data collection procedure in which no incisions or sedation are required) tethered capsule endomicroscopy (TCE) or trans-nasal imaging tube (TN IT) procedure for diagnosing CD (FIGS. 1A, 1B). This image data is generally obtained from the upper gastrointestinal (GI) tract, particularly the duodenum, due to the fact that it can be accessed through the mouth via the stomach. The device is inserted through the mouth (e.g. using a TCE device) or nose (e.g. using a TNIT device) of the subject and fed through the esophagus through the stomach to the upper portions of the small intestine, particularly the duodenum. In various embodiments, the subject may include a subject with active CD, inactive CD, or a normal/healthy subject, among others. The operator of the TCE or TNIT device may be a clinician such as a doctor, a nurse, or other medical professional. TCE and TNIT devices provide high microscopic information of the villous morphology, with the ability to demonstrate villous changes that accompany celiac disease without requiring sedation of the patient. In certain embodiments, the images obtained by TCE and TNIT also contain information that can serve as biomarkers for inflammation that accompany celiac disease. Given that a biomarker is a characteristic that is objectively measured and evaluated as an indicator of normal biological processes, pathogenic processes, or pharmacologic responses to a therapeutic intervention, the metrics (e.g. morphometric features or textural metrics) for diagnosing conditions that disclosed herein constitute biomarkers for the conditions.

FIG. 1A shows a photograph of a TCE device that can be used to carry out embodiments of the disclosed procedures. FIG. 1B shows a diagram of an optical coherence tomography (OCT)-based TCE device that can be used to carry out embodiments of the disclosed procedures (top) (examples of suitable TCE devices are shown in US 2013/0310643 and Gora et al. (GI Endoscopy 88:830-840; 2018), each of which is incorporated herein by reference in its entirety). Also shown in FIG. 1B is an optional embodiment in which the device can be provided as part of a trans-nasal imaging tube (TNIT) device with a balloon which can be coupled to the OCT system via an optical rotary junction (bottom) (an example of a suitable TNIT device is shown in US 2020/0139092, which is incorporated herein by reference in its entirety).

Given that the GI tract is generally tubular in shape, the two versions of the device shown in FIG. 1B include mechanisms for obtaining OCT data from a full circumferential view of the tissue surrounding the device. In the embodiment shown in the top portion of FIG. 1B, the TCE device includes an angled mirror that rotates (e.g. driven by a motor at the distal end of the capsule) to direct the beam of light around the perimeter of the capsule and to collect reflected light from the tissue. In the embodiment shown in the bottom portion of FIG. 1B, the optical fiber extending through the tether has an angled reflecting portion (e.g. a mirror or an angled polished surface) at the distal end which is rotated along with the fiber to direct light around the perimeter of the tissue surrounding the TNIT device and collect reflected light from the tissue. The fiber in this latter embodiment is rotated by a rotary device (which can be associated with the optical rotary junction) and coupled to the OCT system by an optical rotary junction which maintains optical coupling between the OCT system and the fiber while permitting the fiber to rotate.

Figure 1D:
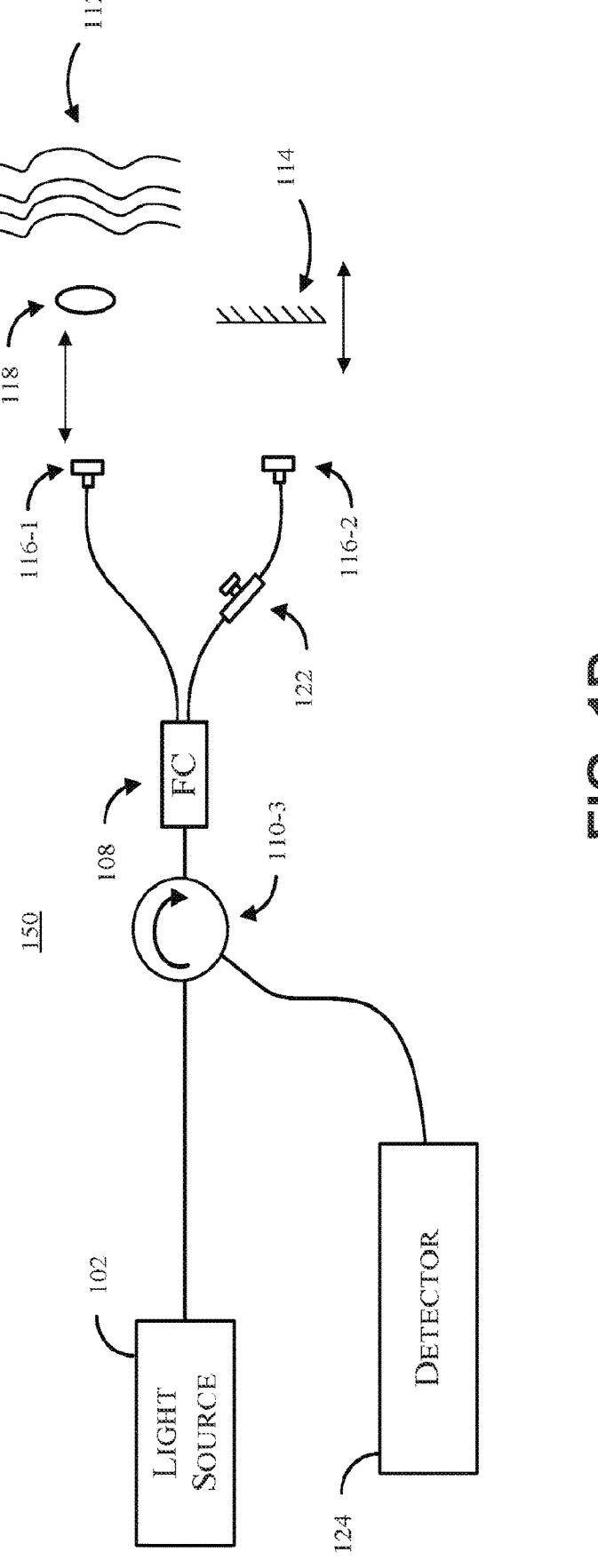
Figure 10:
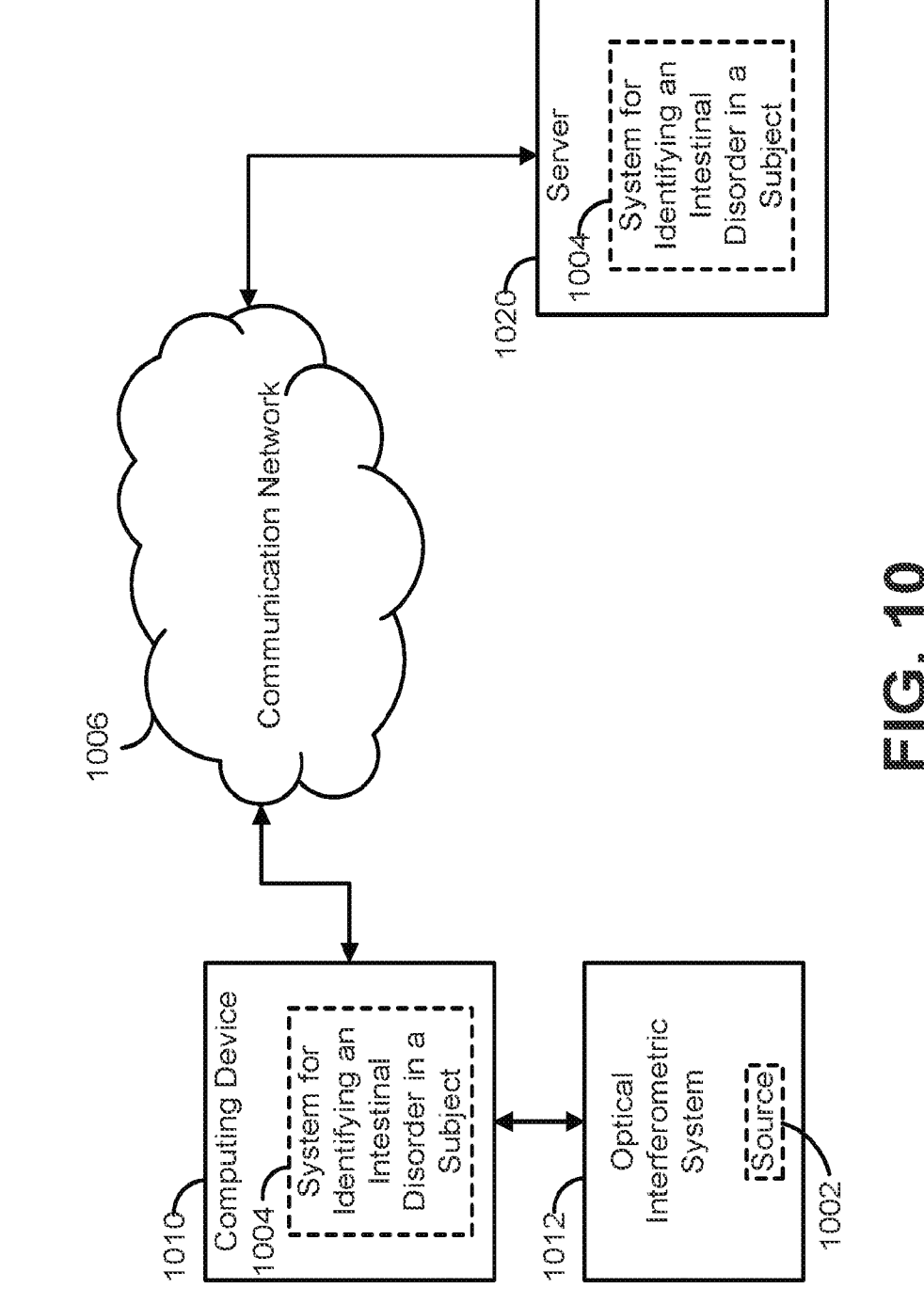

Both of the TOE- and TNIT-based devices are used to collect data using light-based imaging, which in particular embodiments includes obtaining interferometric data based on optical coherence tomography (OCT). FIGS. 10 and 1D show examples 100 and 150 of optical coherence tomography (OCT) systems that can be used with embodiments of the disclosed system, although other OCT systems may also be used. In either case, collimating optics 116-1 and focusing optics 118 can be housed at the distal end of the fiber associated with the TCE or TNIT devices shown in FIG. 1B.

FIG. 10 shows a representation of a widely used configuration of an OCT system, which uses a Mach-Zehnder interferometer for OCT. FIG. 1D is another widely used configuration of an OCT system which uses a Michelson interferometer for OCT. In various embodiments the OCT system can be an SS-OCT or an SD-OCT system or a system based on other OCT modalities. In a conventional SD-OCT system, a broadband light source and a linear detector is used to acquire the entire available spectrum at a given time. The imaging depth range is determined by both the number of pixels and width of the pixels in a linear detector used to acquire the spectrum. In a conventional SS-OCT system, a wavelength-swept light source and a single point detector (such as a photodetector, photodiode, photomultiplier tube etc.) is used to acquire the spectrum as a function of time. The imaging depth range is determined by both the bandwidth of the source and the sampling rate of the detector used to acquire the spectrum.

As shown in FIG. 10, a light source 102 can provide light to a sample arm and a reference arm via a fiber coupler 108. A portion of light is directed toward a sample arm (e.g., 80%), while a second portion of light is directed toward the reference arm (e.g., 20%). An optical circulator 110-1 directs light received from fiber coupler 108 toward a sample 112 (in the sample arm), and a second optical circulator 110-2 directs light toward a reference reflector 114 (in the reference arm). Light in the sample arm can be directed toward the sample via collimating optics 116-1 and focusing optics 118 (e.g., a lens such as a ball lens), which can project a beam with a depth of focus centered near the surface of sample 112. A portion of the beam can be reflected at various depths of the sample as a function of reflectivity of the sample, which is then received by focusing optics 118 and directed toward optical circulator 110-1 via collimating optics 116-1, which directs the reflected light toward a fiber coupler 120 to be combined with light from the reference arm. Collimating optics 116-2 direct a beam from the reference arm toward reference reflector 114, which reflects the beam back toward optical circulator 110-2 via collimating optics 116-2, and optical circulator 110-2 directs the light reflected by reference reflector 114 toward fiber coupler 120 via a polarization controller 122 to be combined with light from the sample arm. Fiber coupler 120 combines the light from both the sample arm and the reference arm, and directs the light toward detector 124, which generates a signal representing the structure of the sample adjacent to the probe.

System 150 depicted in FIG. 1D operates using similar principles to system 100 depicted in FIG. 10, but includes only a single optical circulator 110-3 before fiber coupler 108, rather than using an optical circulator in both the sample arm and reference arm. In both system 100 and system 150, the length of the reference arm can be set by adjusting the position of reference reflector 114 to set the depth of the zero-delay point with respect to sample 112.

Figure 2:
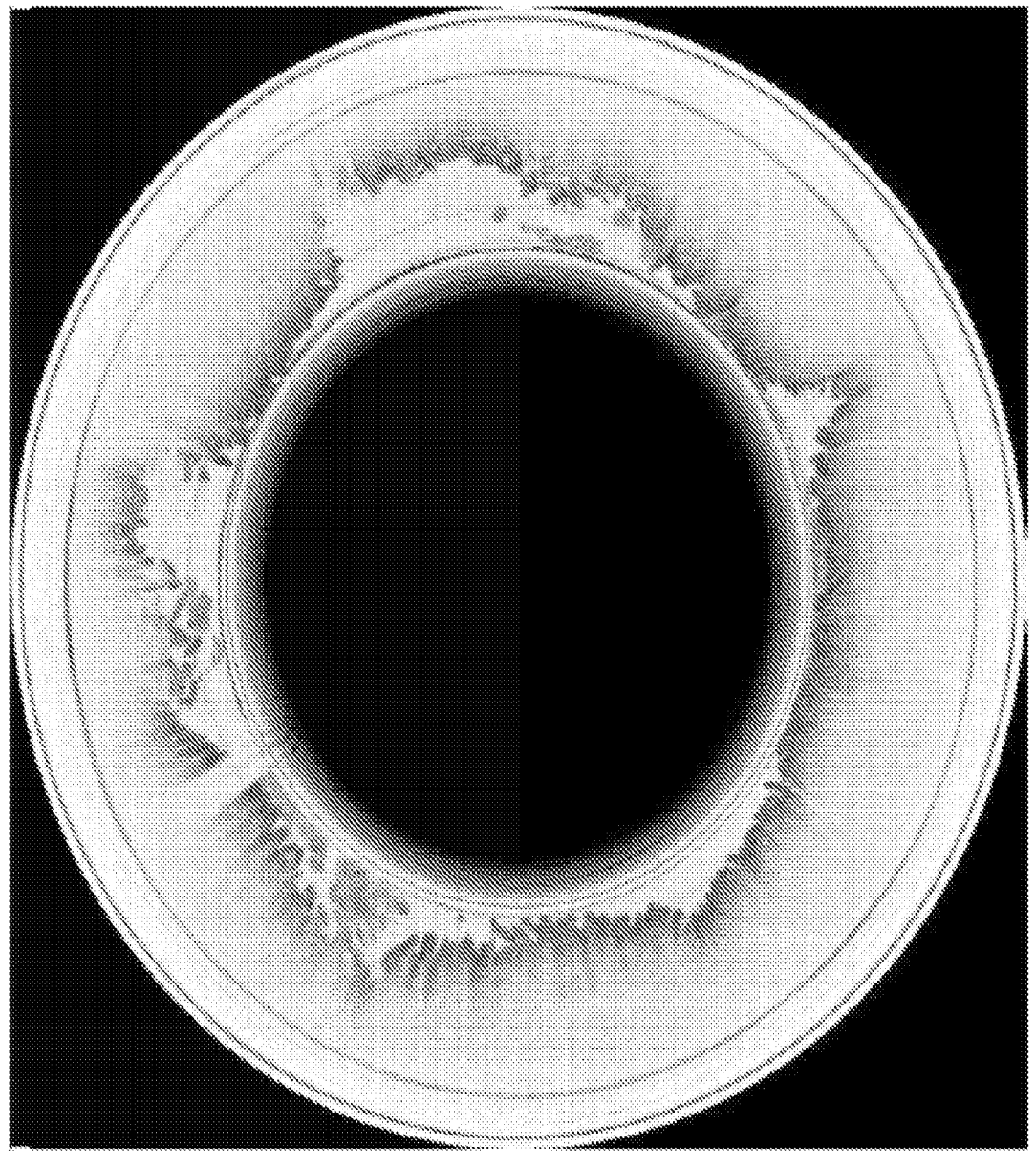
FIG. 2 shows an example of optical coherence tomography (OCT) image data obtained from the duodenum using TCE.
Figure 3C:
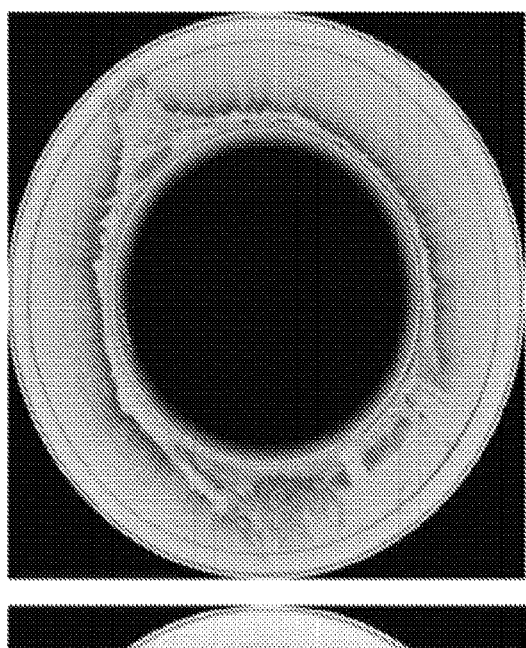
FIGS. 3A-3C show OCT image data obtained using TCE, where the images have been manually segmented to identify the outlines of villi.
Figure 3B:
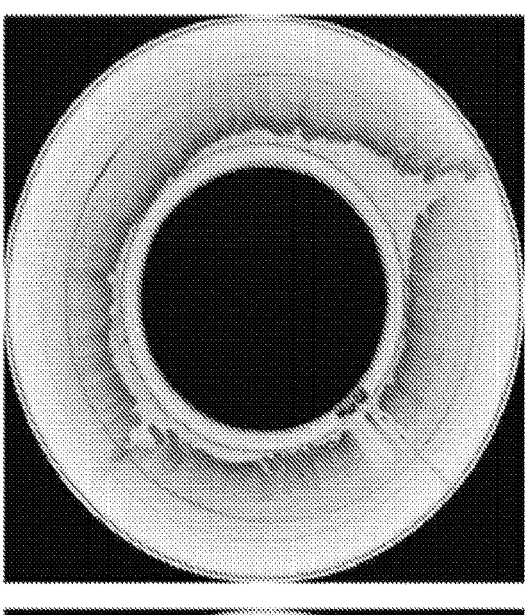
Figure 3A:
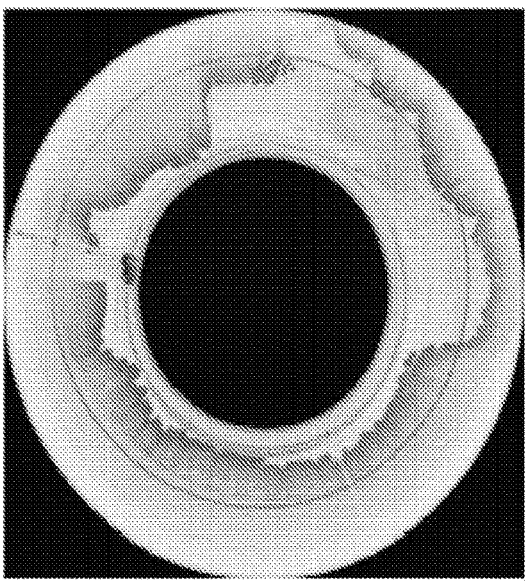
Figure 3D:
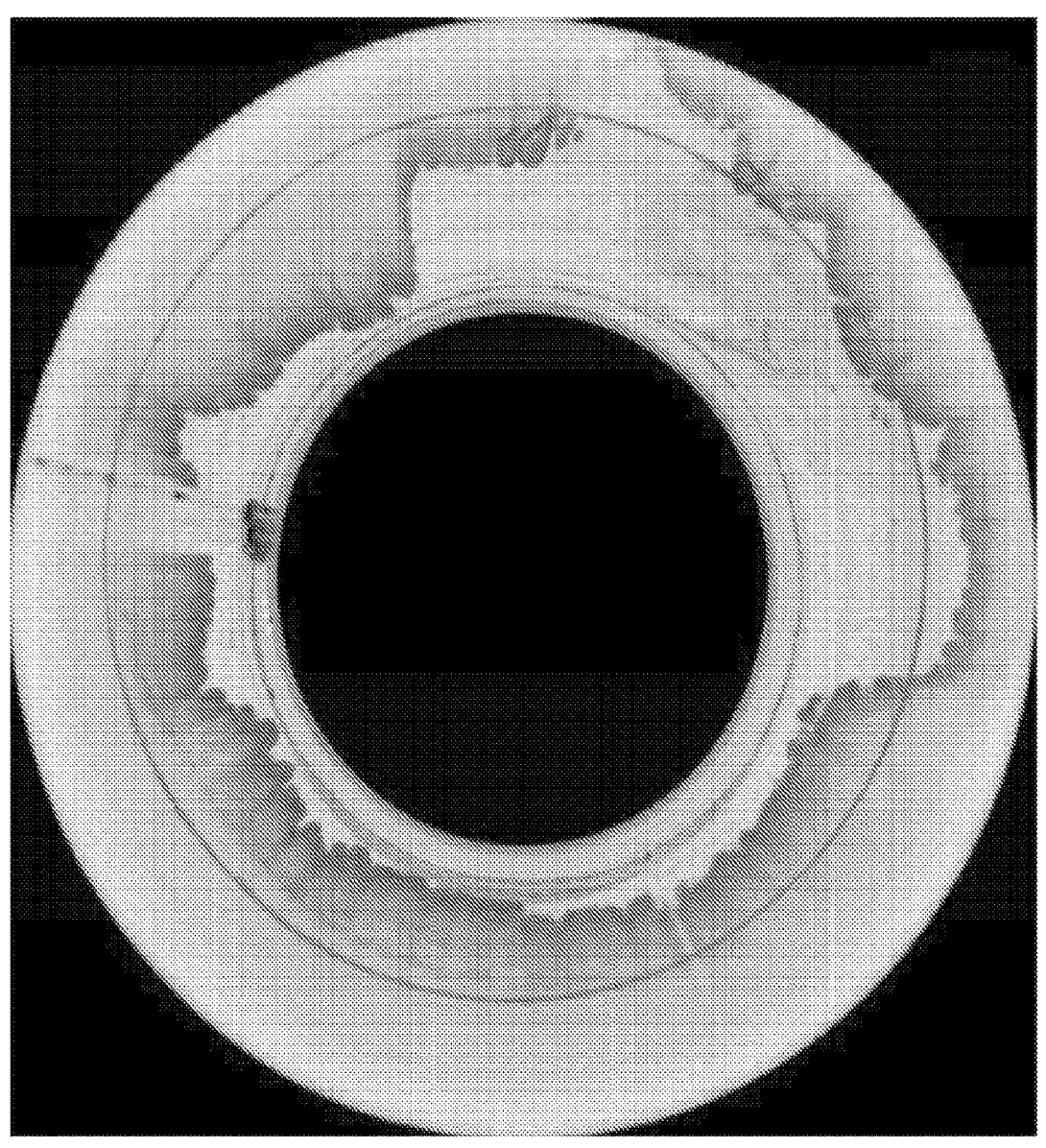
FIG. 3D shows an enlarged view of the image from FIG. 3A to better highlight the segmented villi.

In one embodiment, a TCE or TN IT device is used to obtain optical coherence tomography (OCT) images (FIG. 2) of the duodenum which are then analyzed to provide a diagnosis of CD. An advantage of the TCE- or TNIT-based procedure is that the capsule or TN IT probe can be swallowed without having to sedate the patient. In general, the disclosed procedures involve obtaining OCT image data (e.g. using a TCE or TNIT device) from a subject, analyzing the images including segmenting structures such as villi (e.g. manually segmenting), and comparing values of parameters (e.g. height, width, intensity) obtained from the segmented structures of the subject with typical values obtained from subjects known to have active CD, inactive CD, and no CD (healthy subjects) to determine whether the subject is likely to have active or inactive CD.

FIG. 3 shows examples of OCT image data with segmented villi from subjects with active CD (FIG. 3A), inactive CD (FIG. 3B), and no CD (healthy subject; FIG. 3C). FIG. 3D shows an enlarged view of the image from FIG. 3A to better highlight the segmented villi. In some embodiments, villi can be manually segmented, for example using image analysis software (e.g. NIH ImageJ), or can be segmented automatically or semi-automatically using suitably trained software (e.g. using machine vision or image/pattern recognition software that has been trained on similar samples).

The segmented villi are then analyzed using one or more metric, including morphometric features or texture metrics. These metrics can include, without limitation, morphometric features including villous height and villous width, and gray level co-occurrence texture metrics including mean intensity, contrast, correlation, energy, entropy, variance, and homogeneity. For initial studies to determine the extent to which any of these metrics can be used to identify samples from subjects who have CD (active or inactive) compared to tissue from normal, healthy subjects, multiple samples were obtained and the metrics that were collected were subjected to statistical analysis to determine the statistical significance of each metric. Statistical tests that were used for this analysis include the D'Agostino & Pearson normality test, the unpaired Mann Whitney t-test, and one-way ANOVA tests, although other statistical procedures and tests could also be used.

The morphometric features including villous height and villous width can be determined manually (e.g. using tools available in an image processing and analysis program such as NIH ImageJ) or automatically (e.g. using image analysis software). Villous height can be measured relative to an adjacent trough next to the villus and villous width can be determined at the base (e.g. where the villus is seen to meet the adjacent troughs) or at a particular point along the villus (e.g. at a point halfway between the trough and the peak of the villus).

Gray level co-occurrence texture metrics such as mean intensity, contrast, correlation, energy, entropy, variance, and homogeneity are applied to the image data (e.g. pixel grayscale values) contained within the segmented villus regions. The texture metrics can be calculated using image analysis software tools such as Matlab (MathWorks) or using custom software (e.g. based on C++ or C #). Since OCT data is obtained from the surface as well as from tissue below the surface of the villi, the grayscale information provides an indication of the condition of the tissue just below the surface of the villi.

The mean intensity is the average pixel intensity of the segmented region. The contrast is the average intensity difference between each pixel and its adjacent pixels. The correlation is a measure of how similar the image pixel values are to one another; the correlation value is 1 for a perfectly positively correlated image and 0 for negatively correlated image. Energy is also a metric that measures uniformity of an image, where an image with similar pixel values has a high energy rate such that if all pixel values are the same, the energy value is 1. Entropy measures the degree of disorder among pixels in an image. Variance in the image texture is obtained by calculating the mean pixel value and ascertaining the dispersion around that mean value. Homogeneity is a measure of the smoothness of the gray level distribution of an image.

FIGS. 4-9 show results of analyses based on metrics obtained from subjects with active CD (ACD), inactive CD (ICD), and normal/healthy subjects (HS), including notations showing the statistical significance of the differences between each of the metrics. Data from four different subjects were used for each category (ACD, ICD, HS). A total of 10 frames were obtained for each of the subjects and a minimum of 50 villi were analyzed for each subject. For the present studies, villi were manually segmented using an ImageJ tool. To provide consistent and robust data, criteria for choosing frames from which to extract data included frames having good contrast, little to no artifacts, and at least five villi that were able to be segmented. Once selected, all frames were randomized prior to analysis and the analyses were performed in a blinded fashion. Furthermore, villi that were selected for analysis were those which were not in contact with the capsule surface and were not overlapping with other villi.

Figures 4, 5:
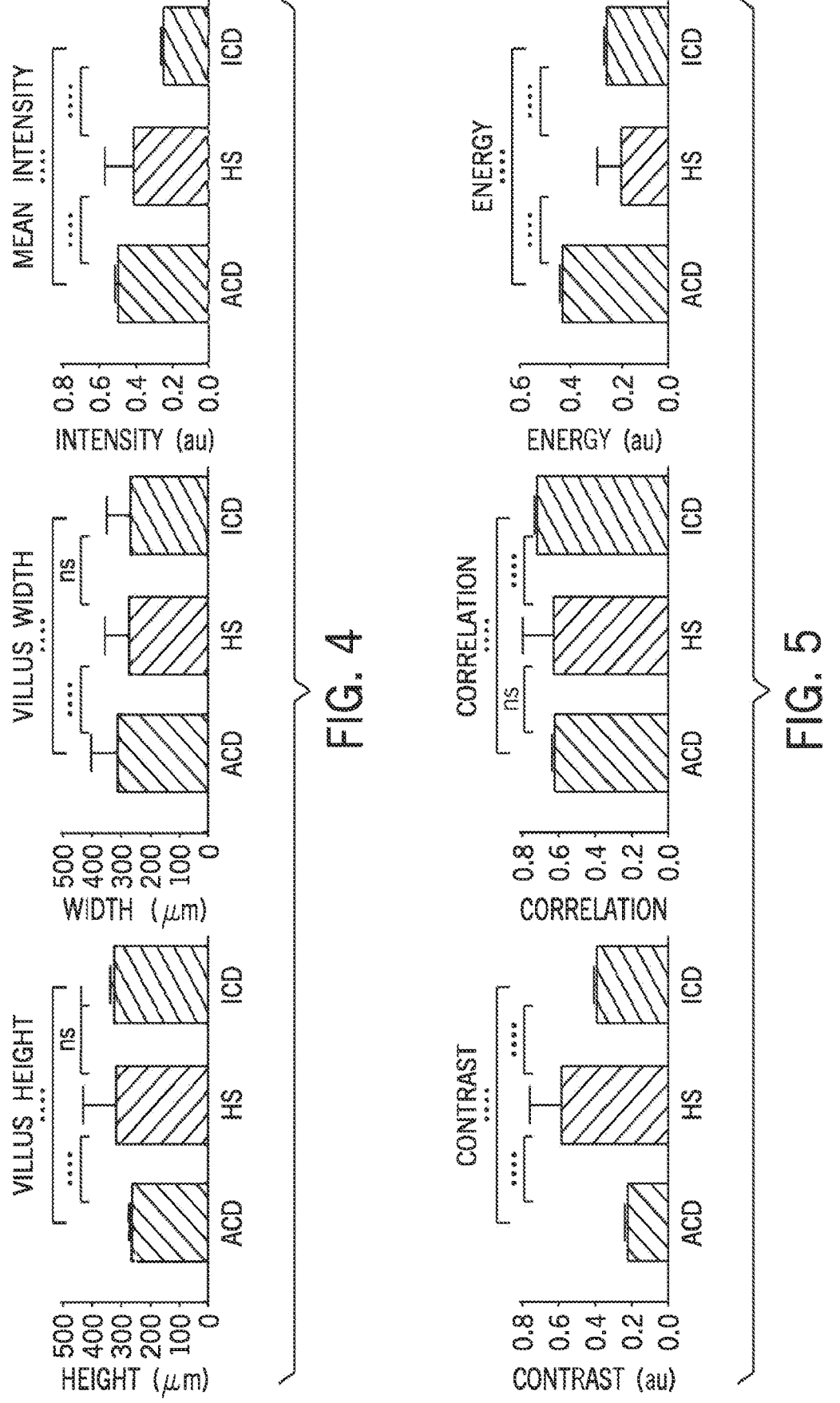
FIG. 4 shows bar charts (mean±SD) comparing results of measurements of villus height, villus width, and mean intensity of pixels within the segmented regions for subjects with active CD (ACD) or inactive CD (ICD) as well as normal/healthy subjects (HS). Also shown are brackets with indications of the statistical significance between each pair of bars, with "****" indicating statistical significance and "ns" indicating no statistical significance, using the unpaired Mann Whitney t-test.
FIG. 5 shows bar charts (mean±SD) comparing results of measurements of contrast, correlation, and energy of pixels within the segmented regions for ACD, ICD, and HS subjects. Also shown are brackets with indications of the statistical significance between each pair of bars, with "****" indicating statistical significance and "ns" indicating no statistical significance, using the unpaired Mann Whitney t-test.

FIG. 4 shows bar charts (mean±SD) comparing results of measurements of villus height, villus width, and mean intensity of pixels within the segmented regions for subjects with active CD (ACD) or inactive CD (ICD) as well as normal/healthy subjects (HS). Also shown are brackets with indications of the statistical significance between each pair of bars, with "****" indicating statistical significance and "ns" indicating no statistical significance, using the unpaired Mann Whitney t-test.

FIG. 5 shows bar charts (mean±SD) comparing results of measurements of contrast, correlation, and energy of pixels within the segmented regions for ACD, ICD, and HS subjects. Also shown are brackets with indications of the statistical significance between each pair of bars, with "****" indicating statistical significance and "ns" indicating no statistical significance, using the unpaired Mann Whitney t-test.

Figures 6, 7:
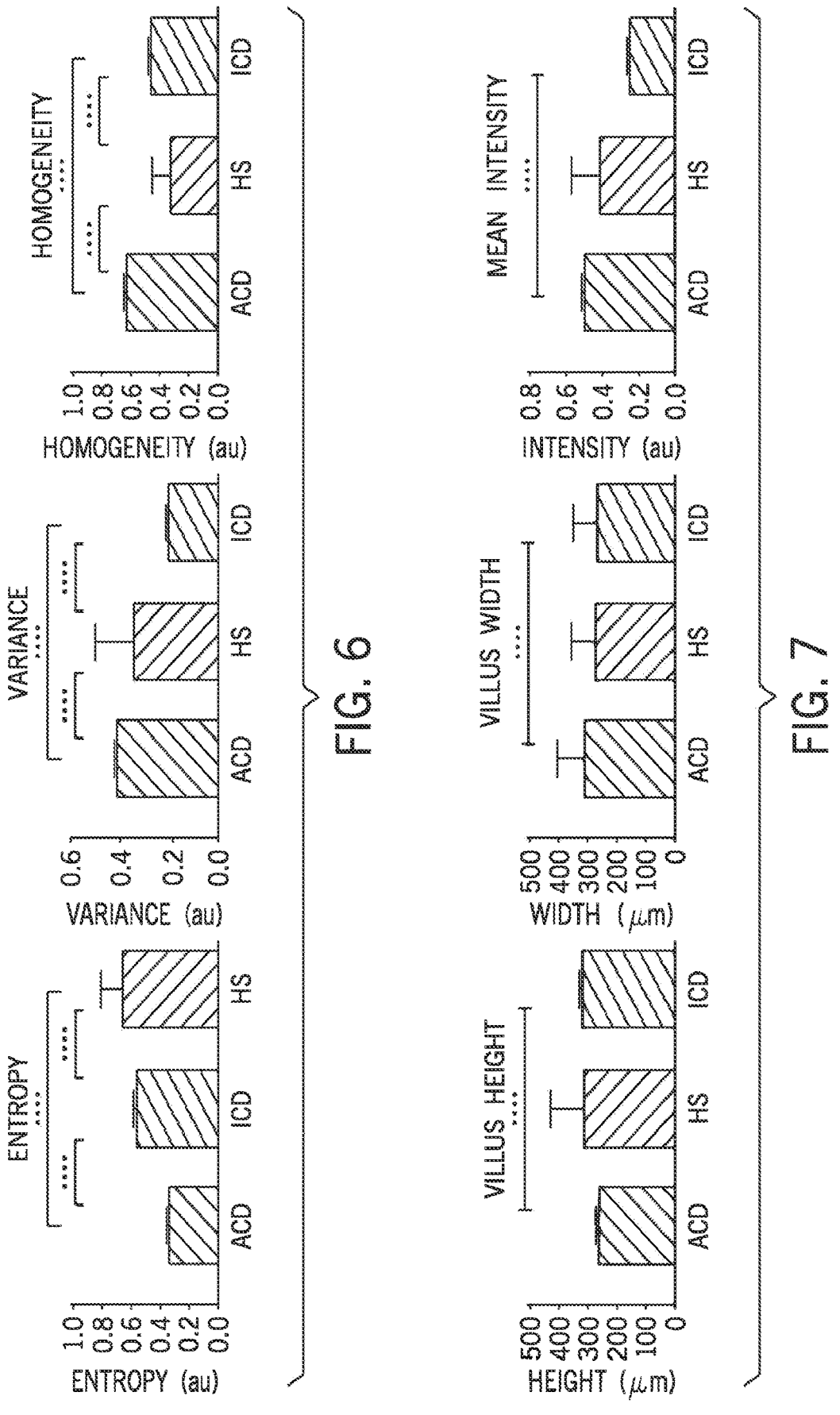
FIG. 6 shows bar charts (mean±SD) comparing results of measurements of entropy, variance, and homogeneity of pixels within the segmented regions for ACD, ICD, and HS subjects. Also shown are brackets with indications of the statistical significance between each pair of bars, with "****" indicating statistical significance using the unpaired Mann Whitney t-test.
FIG. 7 shows bar charts (mean±SD) comparing results of measurements of villus height, villus width, and mean intensity of pixels within the segmented regions for ACD, ICD, and HS subjects. Also shown is a bracket indicating the statistical significance between each pair of bars, with "****" indicating that all three samples are statistically significant from one another as determined using a one-way ANOVA test.

FIG. 6 shows bar charts (mean±SD) comparing results of measurements of entropy, variance, and homogeneity of pixels within the segmented regions for ACD, ICD, and HS subjects. Also shown are brackets with indications of the statistical significance between each pair of bars, with "****" indicating statistical significance using the unpaired Mann Whitney t-test.

FIG. 7 shows bar charts (mean±SD) comparing results of measurements of villus height, villus width, and mean intensity of pixels within the segmented regions for ACD, ICD, and HS subjects. Also shown is a bracket indicating the statistical significance between each pair of bars, with "****" indicating that all three samples are statistically significant from one another as determined using a one-way ANOVA test.

Figures 8, 9:
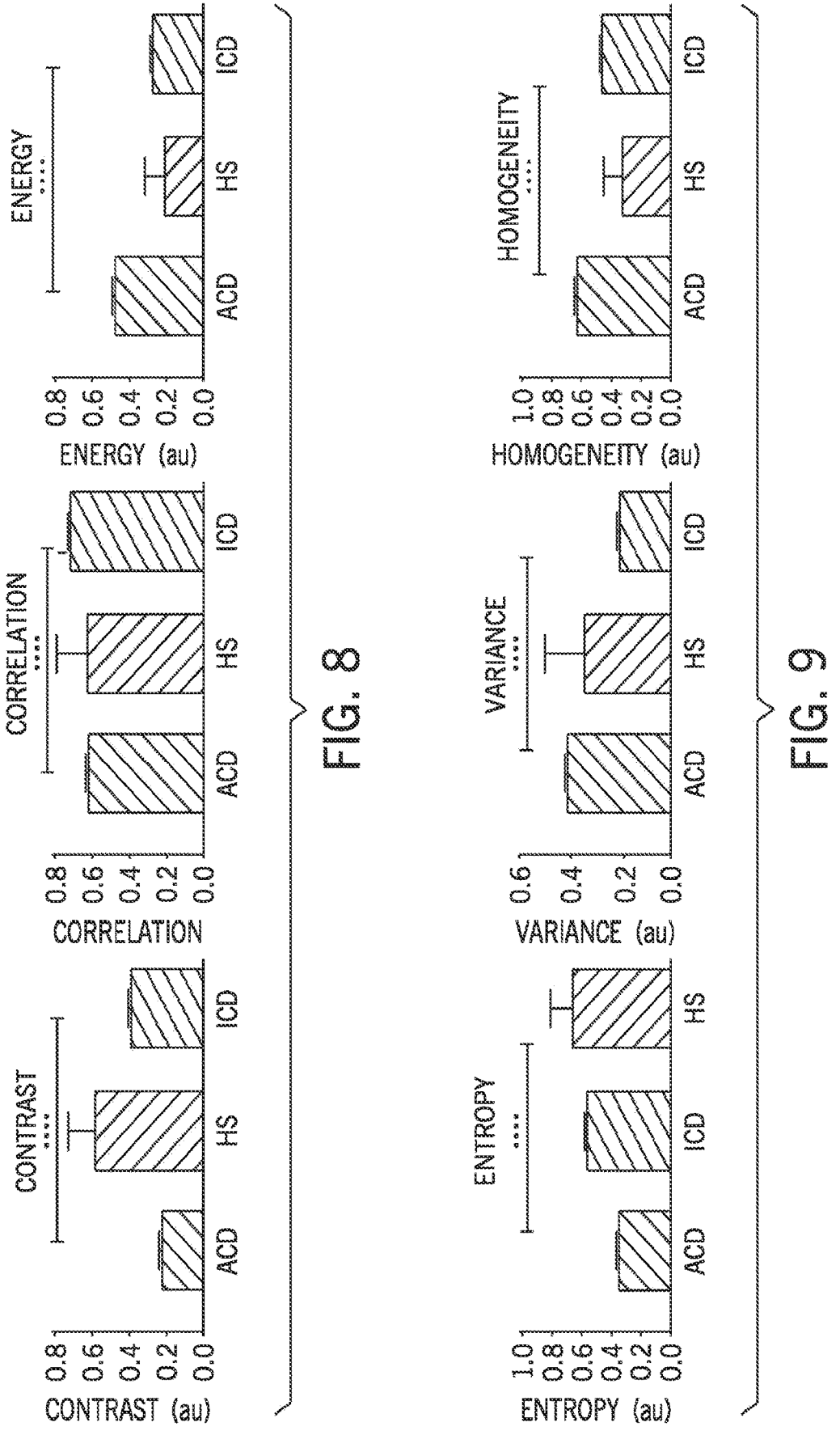
FIG. 8 shows bar charts (mean±SD) comparing results of measurements of contrast, correlation, and energy of pixels within the segmented regions for ACD, ICD, and HS subjects. Also shown is a bracket indicating the statistical significance between each pair of bars, with "****" indicating that all three samples are statistically significant from one another as determined using a one-way ANOVA test.
FIG. 9 shows bar charts (mean±SD) comparing results of measurements of entropy, variance, and homogeneity of pixels within the segmented regions for ACD, ICD, and HS subjects. Also shown is a bracket indicating the statistical significance between each pair of bars, with "****" indicating that all three samples are statistically significant from one another as determined using a one-way ANOVA test.

FIG. 8 shows bar charts (mean±SD) comparing results of measurements of contrast, correlation, and energy of pixels within the segmented regions for ACD, ICD, and HS subjects. Also shown is a bracket indicating the statistical significance between each pair of bars, with "****" indicating that all three samples are statistically significant from one another as determined using a one-way ANOVA test.

FIG. 9 shows bar charts (mean±SD) comparing results of measurements of entropy, variance, and homogeneity of pixels within the segmented regions for ACD, ICD, and HS subjects. Also shown is a bracket indicating the statistical significance between each pair of bars, with "****" indicating that all three samples are statistically significant from one another as determined using a one-way ANOVA test.

As seen in the data presented in FIGS. 4-9, there is a statistically significant difference in the morphometric and texture metrics of the segmented regions of the OCT images between samples from subjects having active CD, inactive CD, and normal/healthy subjects. Therefore, we have shown that OCT images obtained using a tethered TCE or TNIT device, neither of which requires sedation, can be used to obtain a tissue diagnosis of CD based on morphometric or texture metric image descriptors. A diagnosis of ACD or ICD can be made based on a single metric or based on combinations of two or more of the metrics disclosed herein. For a particular subject or patient, OCT images may be obtained (e.g. using a TCE or TNIT device) and multiple villi can be segmented (e.g. in the same frame or multiple frames) and analyzed. The metric(s) obtained from such analysis can then be compared to standard metric values determined from samples obtained from subjects with known status (e.g. ACD, ICD, HS) such as those shown in FIGS. 4-9. The correlation of the new patient's metric(s) with the standards, as confirmed using a statistical measure, is then used to provide a diagnosis or likelihood of a status such as having active CD, inactive CD, or neither (healthy subject, HS).

Embodiments of the disclosed procedures provide numerous advantages over standard procedures for diagnosing CD. For example, TCE- and TNIT-based methods for obtaining biomarkers for celiac disease are less costly and can be made available to patients at regular intervals with a minimal cost burden extended to them. The disclosed procedures provide information on villous changes and also provide extra biomarker flags that can be used to confirm celiac disease. The procedures reduce the possibility for false negatives since it has the capability to provide volumetric information for the entire small intestine. That is, the TCE or TNIT device can be used to obtain volumetric image information of any portion of the small intestine (e.g. the portions adjacent to a CD-affected portion of the duodenum) so that the clinician can see any potential lesions in context and avoid a possible false negative diagnosis that could occur if only a small sample was biopsied. As with any other data obtained using the disclosed procedures, the volumetric images can be assessed through visual inspection or automated software-based procedures, or a combination of these approaches. Diagnosis can be provided in real-time or near real-time either by relaying the information to a trained pathologist or through the use of machine-vision aided approaches to segment the images and determine one or more metrics based on the segmented data. In various embodiments, the machine-vision approach may be a custom machine learning approach developed in-house based on established image and pattern recognition procedures known to those skilled in the art and in some embodiments can provide metrics and/or a diagnosis rating. The progress of a subject's response to a CD treatment medication and/or responses to dietary changes could be monitored easily using a TCE or TNIT device, procedures which can be administered at a primary care setting. Furthermore, since the procedures do not require anesthesia/sedation they can be used in infants and pregnant women who may not be eligible for upper EGD.

Turning to FIG. 10, an example 1000 of a system (e.g. a data collection and processing system) for identifying an intestinal disorder in a subject is shown in accordance with some embodiments of the disclosed subject matter. As shown in FIG. 10, a computing device 1010 can receive interferometric data from an optical interferometric system 1012. In some embodiments, computing device 1010 can execute at least a portion of a system for identifying an intestinal disorder in a subject 1004 to generate an image based on the interferometric data received from optical interferometric system 1012. Additionally or alternatively, in some embodiments, computing device 1010 can communicate information about the interferometric data received from optical interferometric system 1012 to a server 1020 over a communication network 1006, which can execute at least a portion of system for identifying an intestinal disorder in a subject 1004 to generate an image based on the interferometric data. In some such embodiments, server 1020 can return information to computing device 1010 (and/or any other suitable computing device) indicative of an output of system for identifying an intestinal disorder in a subject 1004, such as the image information and/or metrics obtained using the image information. This information may be transmitted and/or presented to a user (e.g. a researcher, an operator, a clinician, etc.) and/or may be stored (e.g. as part of a research database or a medical record associated with a subject).

In some embodiments, computing device 1010 and/or server 1020 can be any suitable computing device or combination of devices, such as a desktop computer, a laptop computer, a smartphone, a tablet computer, a wearable computer, a server computer, a virtual machine being executed by a physical computing device, etc. As described herein, system for identifying an intestinal disorder in a subject 1004 can present information about the interferometric data, the image information, and/or metrics obtained using the image information to a user (e.g., researcher and/or physician).

In some embodiments, optical interferometric system 1012 may include an electro-magnetic radiation source 1002, which can be any source suitable for optical interferometry. In other embodiments, electro-magnetic radiation source 1002 can be local to computing device 1010. For example, electro-magnetic radiation source 1002 may be incorporated with computing device 1010 (e.g., computing device 1010 can be configured as part of a device for capturing and/or storing optical interferometric information). As another example, electro-magnetic radiation source 1002 may be connected to computing device 1010 by a cable, a direct wireless link, etc. Additionally or alternatively, in some embodiments, electro-magnetic radiation source 1002 can be located locally and/or remotely from computing device 1010, and can communicate information to computing device 1010 (and/or server 1020) via a communication network (e.g., communication network 1006).

In some embodiments, communication network 1006 can be any suitable communication network or combination of communication networks. For example, communication network 1006 can include a Wi-Fi network (which can include one or more wireless routers, one or more switches, etc.), a peer-to-peer network (e.g., a Bluetooth network), a cellular network (e.g., a 4G network, a 5G network, etc., complying with any suitable standard, such as CDMA, GSM, LTE, LTE Advanced, WiMAX, etc.), a wired network, etc. In some embodiments, communication network 1006 can be a local area network, a wide area network, a public network (e.g., the Internet), a private or semi-private network (e.g., a corporate or university intranet), any other suitable type of network, or any suitable combination of networks. Communications links shown in FIG. 10 can each be any suitable communications link or combination of communications links, such as wired links, fiber optic links, Wi-Fi links, Bluetooth links, cellular links, etc.

Figure 11:
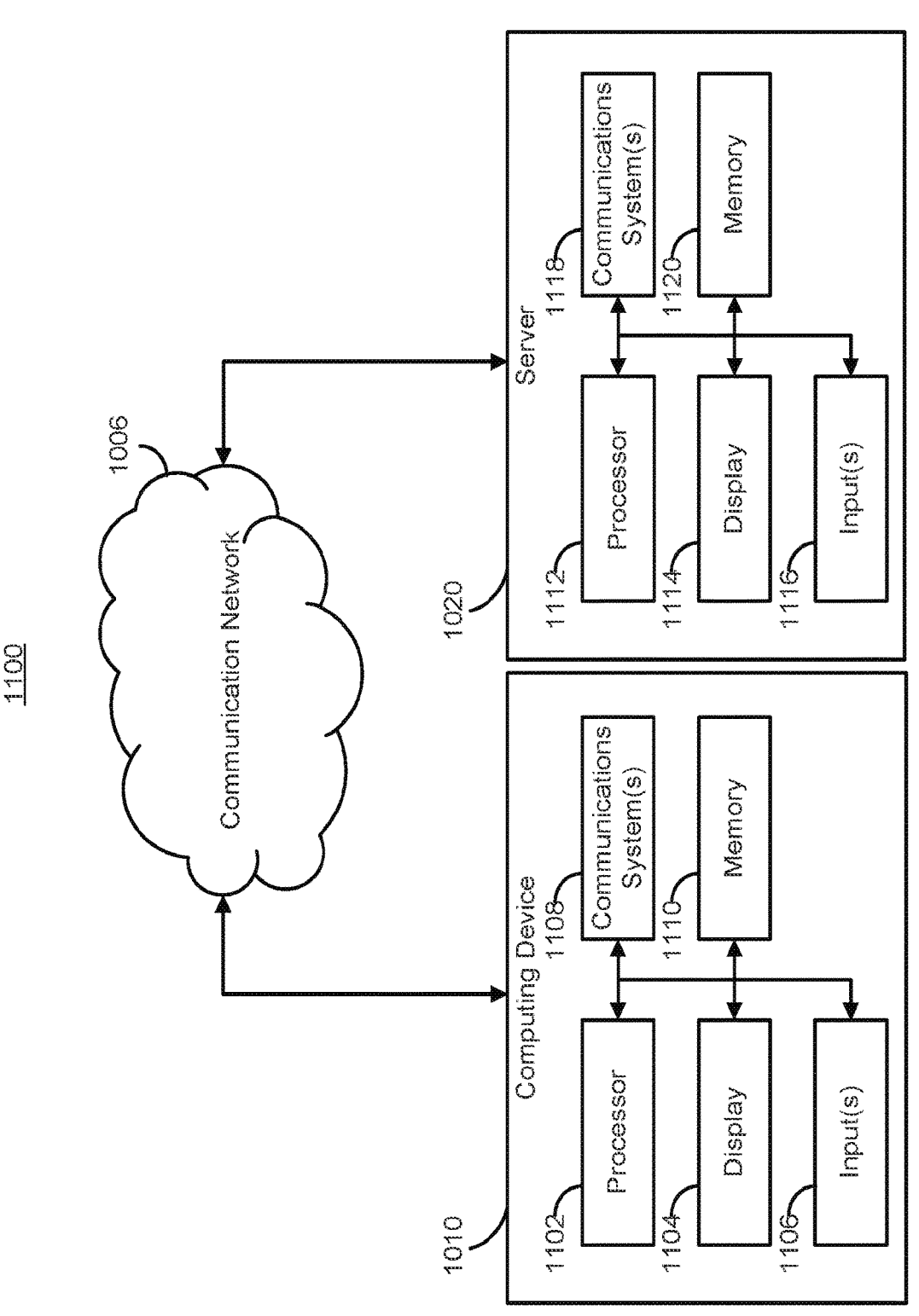
FIG. 11 shows an example of hardware that can be used to implement computing device and server in accordance with some embodiments of the disclosed subject matter.

FIG. 11 shows an example 1100 of hardware that can be used to implement computing device 1010 and server 1020 in accordance with some embodiments of the disclosed subject matter. As shown in FIG. 11, in some embodiments, computing device 1010 can include a processor 1102, a display 1104, one or more inputs 1106, one or more communication systems 1108, and/or memory 1110. In some embodiments, processor 1102 can be any suitable hardware processor or combination of processors, such as a central processing unit, a graphics processing unit, etc. In some embodiments, display 1104 can include any suitable display devices, such as a computer monitor, a touchscreen, a television, etc. In some embodiments, inputs 1106 can include any suitable input devices and/or sensors that can be used to receive user input, such as a keyboard, a mouse, a touchscreen, a microphone, etc.

In some embodiments, communications systems 1108 can include any suitable hardware, firmware, and/or software for communicating information over communication network 1006 and/or any other suitable communication networks. For example, communications systems 1108 can include one or more transceivers, one or more communication chips and/or chip sets, etc. In a more particular example, communications systems 1108 can include hardware, firmware and/or software that can be used to establish a Wi-Fi connection, a Bluetooth connection, a cellular connection, an Ethernet connection, etc.

In some embodiments, memory 1110 can include any suitable storage device or devices that can be used to store instructions, values, etc., that can be used, for example, by processor 1102 to present content using display 1104, to communicate with server 1020 via communications system(s) 1108, etc. Memory 1110 can include any suitable volatile memory, non-volatile memory, storage, or any suitable combination thereof. For example, memory 1110 can include RAM, ROM, EEPROM, one or more flash drives, one or more hard disks, one or more solid state drives, one or more optical drives, etc. In some embodiments, memory 1110 can have encoded thereon a computer program for controlling operation of computing device 1010. In such embodiments, processor 1102 can execute at least a portion of the computer program to present content (e.g., images, user interfaces, graphics, tables, etc.), receive content from server 1020, transmit information to server 1020, etc.

In some embodiments, server 1020 can include a processor 1112, a display 1114, one or more inputs 1116, one or more communications systems 1118, and/or memory 1120. In some embodiments, processor 1112 can be any suitable hardware processor or combination of processors, such as a central processing unit, a graphics processing unit, etc. In some embodiments, display 1114 can include any suitable display devices, such as a computer monitor, a touchscreen, a television, etc. In some embodiments, inputs 1116 can include any suitable input devices and/or sensors that can be used to receive user input, such as a keyboard, a mouse, a touchscreen, a microphone, etc.

In some embodiments, communications systems 1118 can include any suitable hardware, firmware, and/or software for communicating information over communication network 1006 and/or any other suitable communication networks. For example, communications systems 1118 can include one or more transceivers, one or more communication chips and/or chip sets, etc. In a more particular example, communications systems 1118 can include hardware, firmware and/or software that can be used to establish a Wi-Fi connection, a Bluetooth connection, a cellular connection, an Ethernet connection, etc.

In some embodiments, memory 1120 can include any suitable storage device or devices that can be used to store instructions, values, etc., that can be used, for example, by processor 1112 to present content using display 1114, to communicate with one or more computing devices 1010, etc. Memory 1120 can include any suitable volatile memory, non-volatile memory, storage, or any suitable combination thereof. For example, memory 1120 can include RAM, ROM, EEPROM, one or more flash drives, one or more hard disks, one or more solid state drives, one or more optical drives, etc. In some embodiments, memory 1120 can have encoded thereon a server program for controlling operation of server 1020. In such embodiments, processor 1112 can execute at least a portion of the server program to transmit information and/or content (e.g., results of a tissue identification and/or classification, a user interface, etc.) to one or more computing devices 1010, receive information and/or content from one or more computing devices 1010, receive instructions from one or more devices (e.g., a personal computer, a laptop computer, a tablet computer, a smartphone, etc.), etc.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

In some embodiments, the optical signals are detected by photodiodes. It should be recognized that any opto-electronic conversion device including but not limited to photo detectors, photodiodes, line-scan and two-dimensional cameras, and photodiode arrays can be used to perform this detection function.

It should be noted that, as used herein, the term mechanism can encompass hardware, software, firmware, or any suitable combination thereof.

Figure 12:
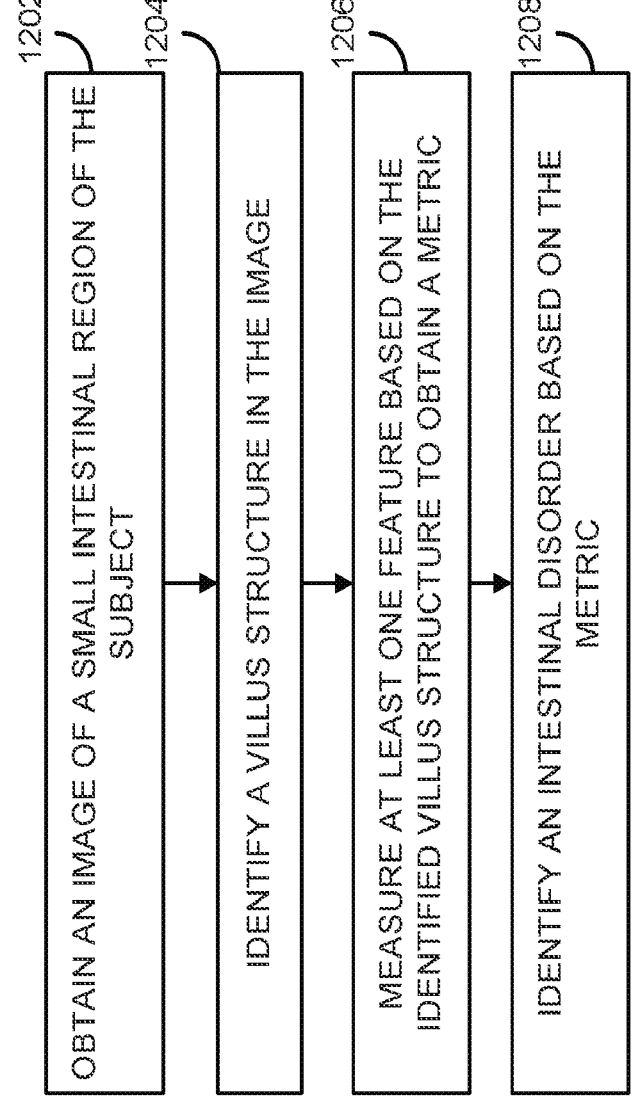
FIG. 12 shows an example of a process for identifying an intestinal disorder in a subject in accordance with some embodiments of the disclosed subject matter.

FIG. 12 shows an example 1200 of a process for identifying an intestinal disorder in a subject in accordance with some embodiments of the disclosed subject matter. As shown in FIG. 12, at 1202, process 1200 can obtain an image of a small intestinal region of the subject. At 1204, process 1200 can identify a villus structure in the image. At 1206, process 1200 can measure at least one feature based on the identified villus structure to obtain a metric. Finally, at 1208, process 1200 can identify an intestinal disorder based on the metric.

It should be understood that the above described steps of the process of FIG. 12 can be executed or performed in any order or sequence not limited to the order and sequence shown and described in the figures. Also, some of the above steps of the processes of FIG. 12 can be executed or performed substantially simultaneously where appropriate or in parallel to reduce latency and processing times.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

What is claimed is:

1. A method for identifying an intestinal disorder in a subject, comprising:
   obtaining an image of a small intestinal region of the subject;
   identifying a plurality of villus structures in the image;
   measuring at least one feature based on the identified villus structure to obtain a metric, comprising:
      measuring at least one feature based on each of the plurality of identified villus structures to obtain a respective plurality of metric values, and obtaining an average of the plurality of metric values; and
   identifying an intestinal disorder based on the metric, comprising:
      identifying an intestinal disorder based on the average of the plurality of metric values.

2. The method of claim 1, wherein identifying an intestinal disorder based on the metric further comprises:
   identifying celiac disease based on the metric.

3. The method of claim 1, wherein obtaining an image of a small intestinal region of the subject further comprises:
   obtaining an image of a small intestinal region of the subject using at least one of a tethered capsule endomicroscopy (TCE) device or a trans-nasal imaging tube (TNIT) device.

4. The method of claim 3, wherein obtaining an image of a small intestinal region of the subject using at least one of a tethered capsule endomicroscopy (TCE) device or a trans-nasal imaging tube (TNIT) device further comprises:
   obtaining obtain interferometric imaging data from a small intestinal region of the subject using at least one of a tethered capsule endomicroscopy (TCE) device or a trans-nasal imaging tube (TNIT) device.

5. The method of claim 1, wherein measuring at least one feature based on the identified villus structure to obtain a metric further comprises:
   measuring at least one feature based on the identified villus structure to obtain at least one of a morphometric feature or a texture metric.

6. The method of claim 5, wherein measuring at least one feature based on the identified villus structure to obtain at least one of a morphometric feature or a texture metric further comprises:
   measuring at least one feature based on the identified villus structure to obtain a morphometric feature comprising at least one of a height of the villus structure or a width of the villus structure, or
   measuring at least one feature based on pixel grayscale values of the identified villus structure to obtain a texture metric.

7. The method of claim 1, wherein identifying an intestinal disorder based on the metric further comprises:
   comparing the metric to a reference value that is determined based on metrics obtained from a subject having with a known disease status,
   identifying an intestinal disorder based on comparing the metric to the reference value.

8. The method of claim 1, wherein identifying a villus structure in the image further comprises:
   identifying the villus structure in the image by segmenting the image.

9. The method of claim 1, wherein measuring at least one feature based on the identified villus structure to obtain a metric further comprises:
   measuring at least one feature based on the identified villus structure to obtain morphometric features comprising a height of the villus structure and a width of the villus structure, and
   measuring at least one feature based on pixel grayscale values of the identified villus structure to obtain texture metrics comprising mean intensity, contrast, correlation, energy, entropy, variance, and homogeneity.

10. A system for identifying an intestinal disorder in a subject, comprising:
   a processor coupled to a memory, the processor being configured to:

obtain an image of a small intestinal region of the subject using tethered capsule endomicroscopy (TCE);

identify a villus structure in the image;

measure at least one feature based on the identified villus structure to obtain a metric comprising:

measuring at least one feature based on the identified villus structure to obtain morphometric features comprising a height of the villus structure and a width of the villus structure, and measuring at least one feature based on pixel grayscale values of the identified villus structure to obtain texture metrics comprising mean intensity, contrast, correlation, energy, entropy, variance, and homogeneity; and identify an intestinal disorder based on the metric.

11. The system of claim 10, wherein the processor, when identifying an intestinal disorder based on the metric, is further configured to:

identify celiac disease based on the metric.

12. The system of claim 10, wherein the processor, when obtaining an image of a small intestinal region of the subject, is further configured to:

obtain an image of a small intestinal region of the subject using at least one of a tethered capsule endomicroscopy (TCE) device or a trans-nasal imaging tube (TNIT) device.

13. The system of claim 12, wherein the processor, when obtaining an image of a small intestinal region of the subject using at least one of a tethered capsule endomicroscopy (TCE) device or a trans-nasal imaging tube (TNIT) device, is further configured to:

obtain interferometric imaging data from a small intestinal region of the subject using at least one of a tethered capsule endomicroscopy (TCE) device or a trans-nasal imaging tube (TNIT) device.

14. The system of claim 10, wherein the processor, when measuring at least one feature based on the identified villus structure to obtain a metric, is further configured to:

measure at least one feature based on the identified villus structure to obtain at least one of a morphometric feature or a texture metric.

15. The system of claim 14, wherein the processor, when measuring at least one feature based on the identified villus structure to obtain at least one of a morphometric feature or a texture metric, is further configured to:

measure at least one feature based on the identified villus structure to obtain a morphometric feature comprising at least one of a height of the villus structure or a width of the villus structure, or measure at least one feature based on pixel grayscale values of the identified villus structure to obtain a texture metric.

16. The system of claim 10, wherein the processor, when identifying an intestinal disorder based on the metric, is further configured to:

compare the metric to a reference value that is determined based on metrics obtained from a subject having with a known disease status, identify an intestinal disorder based on comparing the metric to the reference value.

17. The system of claim 10, wherein the processor, when identifying a villus structure in the image, is further configured to:

identify the villus structure in the image by segmenting the image.

18. The system of claim 10, wherein the processor, when identifying a villus structure in the image, is further configured to:

identify a plurality of villus structures in the image, wherein the processor, when measuring at least one feature based on the identified villus structure to obtain a metric, is further configured to:

measure at least one feature based on each of the plurality of identified villus structures to obtain a respective plurality of metric values, and obtain an average of the plurality of metric values, and wherein the processor, when identifying an intestinal disorder based on the metric, is further configured to:

identify an intestinal disorder based on the average of the plurality of metric values.

* * * * *